Jan. 28, 1969   B. D. HALPERN ET AL   3,423,828
PORCELAIN AND RESIN TOOTH WITH SILICON BONDING AGENT
Filed Oct. 1, 1965

INVENTORS
B. DAVID HALPERN
JOHN O. SEMMELMAN

BY *Sherman & Shalloway*
ATTORNEYS

United States Patent Office 3,423,828
Patented Jan. 28, 1969

3,423,828
PORCELAIN AND RESIN TOOTH WITH SILICON BONDING AGENT
Benjamin David Halpern, Jenkintown, and John O. Semmelman, York, Pa., assignors to The Dentists' Supply Company of New York, York, Pa., a corporation of New York
Filed Oct. 1, 1965, Ser. No. 492,019
U.S. Cl. 32—8
Int. Cl. A61c 13/08, 13/10; B32b 13/12
20 Claims

ABSTRACT OF THE DISCLOSURE

An artificial tooth capable of being strongly and chemically united to a synthetic resin denture base comprising a major proportion of dental porcelain particles, the interstices between such particles being filled with a synthetic dental plastic. The dental plastic and dental porcelain particles are strongly and chemically united by a reactive organic silicon bonding agent present as a coating on the porcelain particles.

---

This invention relates to artificial teeth and more particularly relates to a composition for making the same.

In the past, artificial teeth have been generally of a porcelain or plastic type.

The physical properties of dental procelains more closely resemble the properties of natural teeth than do the properties of the synthetic plastitces. Specifically, hardness, color stability, resistance to flow, resistance to scratching and wear are all far superior in dental porcelain. On the other hand, dental plastics seem to have little of the permanence factors in their favor and are preferred for some applications primarily because their softness renders them easily altered in shape by a dental technician's grinding wheel in order to fit them to specific individual cases. Furthermore, the nature of the thermoplastic resins used in dental plastics is such that no mechanical anchorages are required and teeth of such plastic compositions are capable of perfect union to denture base resins of like composition.

For many years, it has been considered desirable to produce an artificial tooth with the advantageous properties of both dental porcelains and plastics. Previous attempts, such as Myerson Patent 2,463,549, have failed completely because, while they constituted a physical mixture of the two materials, the characteristics of the composite were inferior to either of the materials when manufactured into teeth separately. Thus, because of a complete lack of bonding of the dental porcelain and plastics, the two portions of the tooth would tend to become disengaged from each other leaving a totally inferior tooth both from the standpoint of utility and esthetics.

Various refinements have been advanced, such as matching the thermal and optical characteristics of the porcelain and plastic phases for improved compatibility and, while these have been of minor assistance, they still have fallen far short of giving the optimum physical properties of both materials.

It is therefore a primary object of the present invention to provide an artificial tooth product with the combined optimum properties of both dental porcelains and plastics, i.e., good surface hardness, mechanical strength, resistance to scratching, cold flow, etc., while still providing ease of processing by a dental technician in regards to shape alteration and completely adequate bonding to a resinous denture base material.

It is a further object of this invention to produce an artificial tooth product comprising essentially contiguous dental porcelain particles with interconnected interstices impregnated with plastic material, the plastic and porcelain materials being strongly bonded by a reactive silicon-organic chemical bonding agent.

Other objects and advantages of the invention and a full understanding of the principles thereof will be apparent from the accompanying drawings and the following description of the preferred embodiments of the invention.

In the drawings,

Numeral 1 designates an artificial tooth as viewed from the front. In FIGURES 2–4, like numerals represent like material.

Figure 3:
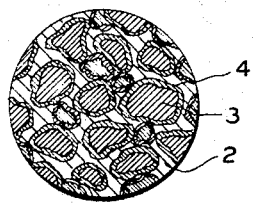
FIG. 3 is an enlarged view of the circled section of the labiolingual vertical section of FIG. 2.

With reference to FIG. 3, it has been found that an excellent composite tooth having the advantageous properties of both the dental porcelain 3 and synthetic dental plastic 2 can be formulated by incorporating into the composite a minor amount of a reactive silicon-organic bonding agent, shown as numeral 4. The thickness of the silicon bonding agent 4 is exaggerated for emphasis; in actuality only an amount necessary to produce a monomolecular coating need be employed to produce the extremely strong bonding effect of the present invention.

We have found that a synergistic type of property is imparted by a silicon compound used as a bonding agent when the same contains a first functional group reactable with either of the aluminol or silanol groups which lie under and on the surface of the porcelain particles in the contiguous porcelain phase 3. This bonding agent also contains another functional group which is reactable chemically in some manner, as by copolymerization, with the synthetic material of the filler 2. The chemical bonds formed between the bonding agent and the two opposing substrates thus provide a dual effect by creating both conventional adhesion and chemical reaction to unite both substrates permanently.

The silicon compounds which have been found effective in producing the strong composite structure of the present invention are those of the generic formulae $RSiX_3$, $R_2SiX_2$ and $R_3SiX$ in which X is selected from the halogen, alkoxy and hydroxyl groups, and other groups reactable with silanol, and wherein R is selected from the vinyl, methacrylate, allyl, methallyl, itaconate, maleate, acrylate, aconitate, fumarate, alkyl, aryl, alkenyl, crotonate, cinnamate and citraconate, sorbate and glycidyl groups. Examples of the compounds which may be utilized include the following: vinyl dimethyl chlorosilane, vinyl dimethyl methoxysilane, divinyl chloromethylsilane, vinyl trichlorosilane, vinyl dichloromethylsilane, 3-(trimethoxysilyl)propyl methacrylate or cinnamate, 3-(glycidoxy propyl) trimethoxysilane, bis(glycidoxypropyl)dimethyl disiloxane, trimethoxy vinyl silane, tri(methoxyethoxy)vinyl silane, triethoxy vinyl silane, vinyl silyl triacetate, gamma(methacryloxypropyl)trimethoxy silane, trimethoxy allyl silane, diallyl diethoxysilane, allyl triethoxy silane, 3-(methoxydimethyl silyl)propyl allyl fumarate, 3-(chlorodimethylsilyl)propyl methacrylate and either the 3-(trimethoxysilyl)propyl allyl maleate, fumarate, itaconate or sorbate, vinyltris(beta-methoxyethoxy) silane, beta(3,4-epoxycyclohexyl)ethyl triethoxysilane, diphenyl diethoxy silane, amyl triethoxysilane, acrylato-tris (methoxysilane).

Instead of using the simple silane or disiloxane derivatives listed above we may also use appropriately substituted polysiloxanes. Depending on the nature of this polysiloxane the adhesive bond may have some elastomeric character.

In one embodiment of our invention employing an alkoxy alkenyl silane bonding agent, it is preferable that at least one of the substituted groups be a terminal alkenyl radical. Unlike some of the other bonding agents disclosed herein, the alkoxy alkenyl silanes have been found to remain less reactive in anhydrous organic solvents The unusual result achieved with the alkoxy silanes is explainable by considering the chemical mechanism accompanying the total reaction. Intermediate to the final reaction, the water hydrolyzes the alkoxy group and removes same from the silane to replace it with an hydroxyl group. This modified intermediate bonding agent, containing an hydroxyl group and taking on the form of a silanol, is reactable directly with the other silanol group lying at the surface of the porcelain substrate. The water may also react with siloxane groups on the surface of the porcelain and convert them to more principally reactive silanol forms. It has been found, however, that a suitable bonding will result on a dry surface also.

Although we have thus far indicated that only the silanes which are monofunctional for the porcelain surface are suitable, it is obvious that the number of groups on the silane which are reactable with the porcelain may be one, two, or three in number. The spirit of our invention is in no way changed when, for example, a bonding agent comprising vinyl trichlorosilane, vinyl dichloromethyl silane or vinyl dimethyl chlorosilane is used. We may, similarly, use a mono, di or tri alkoxy alkenyl silane. The use of a silane having multiple functionality, such as vinyl trichlorosilane, or an acrylate trialkoxysilane, serves ostensibly to increase the number of covalent bonds between the silane and the porcelain surface and hence increases the overall interfacial adhesion therebetween. We may likewise have multiple unsaturate functionality which will serve to increase the number of covalent bonds between the silane bonding agent and the plastic matrix.

The conventional dental porcelains 3 which comprise the basis of the composite tooth structure can be any known dental porcelain having the required structural characteristics and esthetic qualities for use in artificial teeth. Such suitable porcelains may, for example, be selected from the group consisting of feldspathic, nepheline syenite and synthetic porcelains.

It is to be appreciated that the three categories of dental porcelains which are here referred to do, in their inherent characteristics and resistant properties within the meaning of this invention, overlap somewhat, and that there are many similarities between the three which render an exact line of demarcation between them rather difficult. However, insofar as the instant invention be concerned, these three types of dental porcelain are defined in the following with the intention that each category does exhibit differentiations which enable classifying them in the manner herein set forth. It is further to be understood that the following definitions do point up what is meant herein as "dental porcelains," as distinguished from some of the conventional glasses known in the art.

The feldspathic porcelains are derived from the naturally occurring mineral orthoclase (potash feldspar, $K_2O \cdot Al_2O_3 \cdot 6SiO_2$) which is vitrified in sequential steps and forms a glassy phase at about 2050° F. and a crystalline phase (leucite). At about 2350° F. the last trace of the latter crystalline phase is dissolved into the melt and forms a viscous, transparent material capable of sustaining its own shape. Dental porcelains of the feldspathic-type generally contain modifiers such as silica, kaolin and bone ash to produce the needed thermal expansion, strength, opacity and plasticizing characteristics. Some of the dental grade feldspars also containg soda spar or albite and may require preliminary fritting or fusion followed by a grinding operation before being molded into tooth shapes and vitrified.

Nepheline syenite forms the basis for another type of porcelain. Such is actually a naturally occurring mineral. This material is distantly related to the feldspars in that its essential oxides are potassia, soda, alumina and silica. However, its crystalline form is not such that it is capable of fusing to a transparent form-retaining glass from the raw state and it requires prefusing, special grinding and/ or dilution with other glass-forming minerals.

Finally, the materials classified above as synthetic porcelains have been developed in recent years from synthetic glasses. These porcelains are nevertheless distinguished from the normal glasses, as understood in the proper sense, in that they contain a first high-temperature glass particle phase interspersed in a second lower-temperature glass matrix phase. The first phase refractory glass particles in this multiphase system act similarly to crystals in that they increase the viscosity of the overall composition and its ability to retain its premolded shape during vitrification. The two phases also have thermal and optical compatibility-incompatibility relationships similar to the crystals and glass phases in mineral base formulations which are needed to achieve translucency, strength, thermal shock resistance, etc.

Also among the porcelains available for dental use are the so-called alumina-base porcelains. This type of porcelain is derived from a natural mineral steatite or talc, the latter being essentially a magnesia-alumina-silicate compound. Fusing of this material forms a strong and opaque crystalline porcelain at approximately the same temperature as the feldspathic and nepheline syenite porcelains. As would be expected, the fused material possesses a suitable and compatible coefficient of thermal expansion.

Figure 4:
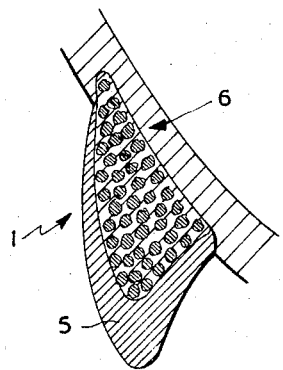
FIG. 4 is a labiolingual vertical section illustrating another embodiment of the present invention.

Such porcelains, although not useful in themselves as esthetic porcelains, may be advantageously employed as a strong insert matrix as in the embodiment illustrated in FIG. 4 in which an esthetic porcelain veneer 5 is employed. The porcelains suitable for the esthetic veneer 5 are the same conventional dental porcelains as set forth above, i.e., feldspathic, nepheline syenite, and synthetic porcelains, for example.

The synthetic plastics 2 useful as impregnants for the porcelain structure may be selected from any of the known dental plastic materials. These can be, for example, any of the conventional acrylate type polymers, such as methyl polymethacrylate, ethyl polymethacrylate, butyl polymethacrylate or epoxies, polystyrenes, polyamides, vinyl resins, such as Luxene, a copolymer of vinyl chloride and vinyl acetate, and mixtures of these and similar resinous materials. Well known auto-cured derivatives of these materials may also be employed. It is only necessary that such materials contain a monomer capable of copolymerizing or be otherwise capable of reacting with the reactive silicon-organic bonding agent 4 whereby an unexpectedly strong chemical bond is produced. Such materials must also be compatible with and copolymerizable with or otherwise combine, as by diffusion, with the denture base material 6 so as to produce a strong bond between the composite tooth and denture base. The materials suitable for the denture base 6 are essentially the same as those set forth for the plastic impregnant 2 above. Methyl and ethyl methacrylates are the preferred materials for both the plastic impregnate 2 and denture base 6.

Although FIG. 4 illustrates one proposed shape in which the composite matrix and impregnant is employed as an insert for an esthetic porcelain veneer, it is to be recognized that proportionately smaller or larger inserts may be advantageously employed where best suited for particular requirements.

Figure 1:
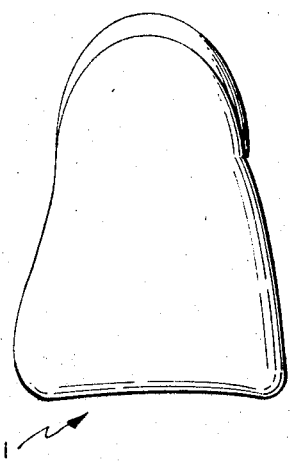
FIG. 1 is a front elevation of an artificial tooth of the present invention.
Figure 2:
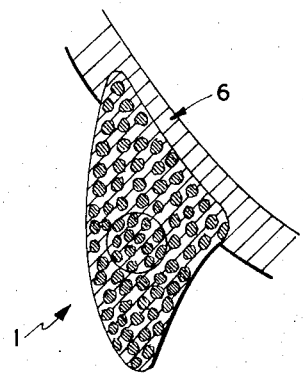
FIG. 2 is a labiolingual vertical section illustrating one embodiment of the present invention.

Also, although the composite teeth of FIGURES 2 and 4 have been shown with a simple tooth shape, an undercut or diatoric structure may be employed to enhance the physical connection and supplement the union of tooth to denture base material.

In general, in the formation of the impregnated matrix of the present invention, the porcelain corresponds to about 50% to about 90%, i.e., a major proportion, preferably 65% to 87% of the impregnated matrix while the plastic impregnant corresponds to approximately 10% to about 50%, preferably 13% to about 35% of the composite by weight. The amount of reactive silicon-organic bonding agent that is employed need only be that amount necessary to produce a coating a few molecules in thickness on the porcelain particles. Ordinarily, an amount corresponding to about 0.1% to about 10%, preferably 2% to 4% of the composite structure, is employed.

The composite teeth and inserts of the present invention are generally prepared by coating a ground dental porcelain with sufficient organic silicon bonding agent so as to produce a coating of a few molecules in thickness on the surface of the ground porcelain particles. The coated powder thus prepared is dried and placed in a conventional metal mould and subjected to pressure to form the shape of the artificial tooth or insert. The porcelain compact so produced is in a state which represents a porous mass in which the solid particles are in contiguous contact with each other and the connecting interstices are an open and permeable structure throughout the mass.

A plastic casting liquid comprising a suitable dental plastic monomer plus dissolved polymer can be poured over the porous compact of porcelain powders (still within the metal mould) and capillary attraction causes it to permeate the porous mass rapidly and completely. The porous porcelain compact confined in the metal mould may be evacuated of air from the interstices, thus enhancing the impregnation by the plastic casting liquid; also, the casting resin is limited to the exact shape of the porcelain compact.

Complete polymerization of the casting liquid is then achieved in any conventional manner by heat, pressure and with or without the use of accelerators.

Furthermore, conventional pigmenting techniques may be employed either for the porcelain and/or the plastic artificial teeth. Inorganic pigments may be incorporated in the preliminary porcelain powders at the time of fritting or grinding and, supplementally, inorganic pigments or organic dyes may be incorporated in the casting resin prior to its use in impregnating the biscuit. In any event the shade may be slightly opaque as a result of the fact that the artificial tooth is a composite of a multiple number of materials and the dissimilar optical indices of refraction do tend to interrupt light transmission. Even though the porcelain powder and the resinous matrix material may be formulated with identical indices of refraction, it is doubtful that the best silicon bonding agent would have exactly the same index of refraction. Therefore, a slight milkiness, which is not so extreme that it cannot be compensated for in the pigmentary formulas, will result.

Following final cure, the moulded composite artificial tooth is finished by removing any seams, undesired mould marks, such as gates through which pressure has been applied, etc.

In the case of production of a composite core for use in combination with an esthetic porcelain veneer, the porcelain veneer may be coated with active silane bonding agent prior to being filled with silane-coated particles, impregnated with plastic casting resin, and final cure.

An alternate technique for manufacturing composite teeth from porcelain particles and resinuous impregnating materials is illustrated as follows:

In order to incorporate the maximum quantity of ceramic material possible and minimize the resinous material and its adverse effect on the hardness properties of the composite moulded article, known theories are applied for the vibratory compaction of particles of known shape and dimension. Various packing theories such as the tetragonal system have been advanced and it has been proven that vibratory-induced packing of large particles falls into a systematic tetragonal pattern. Moreover, if the larger particles are of regular shape and size, the interstices remaining will also be of known shape and size and a second size of ceramic particles can be introduced of the properly calculated sizes and proportions so as to exactly fit these interstices, thus increasing the density of the ceramic compact.

Optimum density, of course, results from starting with the largest possible particles followed by a sequence of three, four, or more successively smaller size particles. However, there are practical limitations in doing this as the largest particles, which normally would impart the greatest density also would impart an undesirable grainy texture to the finished article. Thus the practical maximum has been determined to result from particles averaging 130 microns in diameter. When assuming these particles are approximately round the next smaller particle should be approximately 30 microns in dimension.

A third echelon of particle sizes can be calculated but, in practice, it has been found that this imparts very little additional density to the mass and the additional step is not warranted.

After the particles of varying size have been coated with the silicon bonding agent and thoroughly dried they are ready for blending in the proper proportions of approximately four parts by weight of the coarser beads with one part by weight of the finer beads. This ratio of 4:1 may be varied depending upon the exact dimensions of the beads but in practice it generally would be in excess of 3:1 and less than 15:1. Greater or lesser ratios would afford better compaction and density than a single bead size alone but would not be quite as dense as if the optimum proportion had been maintained.

The coated beads might be pigmented by normal ceramic techniques (inorganic oxides such as zirconium oxide, iron oxide, vanadium oxide, uranium oxide, etc.), without seriously disturbing the packing relationship as the proportion of such inorganic pigments is extremely small and their grain sizes are less than would be critical to proper packing. Alternatively, however, if certain pigments tend to segregate under gravitational force, they may be prefused or fritted into the glass or they may be introduced in suspension in the plastic casting syrup.

A negative or "female" mould is made of a resilient material such as silicone RTV rubber, which is capable of imparting desired labial and lingual anatomy to the front and back surfaces of the moulded tooth product and this mould leaves an open gate at the root or neck end of the tooth through which the loose porcelain powders may be introduced and the compacted article withdrawn. This resilient negative mould is placed upon a vertically vibrating table and the premixed porcelain powders, either dry or in water suspension, are placed into the tooth-shaped cavities of the resilient mould. Slow vibration effects a gradual compaction as the influence of gravitational force carry the larger and more dense particles to the bottom of the mould and subsequent layers of accurately fitting large porcelain particles arrange themselves on this foundation. Simultaneously and automatically the smaller particles fill the interstices so as to give the maximum density article inherent with gravitational influence. Additional increments of the porcelain powder mix have to be added as vibratory compaction reduces apparent bulk. When compaction is essentially complete, there may be a slight excess of the finest grain size particles remaining on the surface and these may be scraped off as they are not needed to fill the interstitial voids of the complete mass.

At this point, a casting liquid is prepared for impregnation of the porcelain compact as herein before described.

The teeth need not be completely cured in the rubber mould but may be removed when a partial cure has been effected and the column of excess material from the gate area (in the position of the tooth root) may be trimmed to give the desired shape of the artificial tooth. Subsequently, cure is completed and any additional polishing or other refinements may be finished.

Still another alternative manufacturing technique is to use conventional, non-coated porcelain powders and organic binders such as flour paste, gum tragacanth, etc. These are pigmented and molded into tooth shapes under pressure and heat as is well known in the art. Subsequently the molded tooth biscuits are fired in furnaces to a temperature sufficiently high to oxidize the binders (removing them as furnace gases) and just initiate fusion or vitrification on the surface of the porcelain particles. Superficial glass formation and bonding starts at the contact points between particles and the particles masses, because of the surface tension effects, are able to retain their form and intermediate open structure.

After cooling, the porous biscuits may be immersed in dilutions of silane bonding agents to thoroughly coat all interconnecting surfaces. Drying is expedited and completed by applications of vacuum to the porous biscuit and vacuum also enhances impregnation of the biscuit with the casting slurry.

The following specific examples illustrate the formation of the composition of the present invention:

*Example 1.*—A conventional dental porcelain compounded by fritting orthoclase feldspar and silica is vitrified at a temperature of approximately 2350° F. for 15 minutes and the resultant frit is thermally quenched to shatter the porcelain and render it easier to grind to appropriate particle sizes for moulding. The porcelain is then reduced by crushing and milling until the coarsest particles are approximately 80–100 mesh and the finest particles approximately 325–400 mesh.

The powder thus prepared is exposed to boiling water for approximately one hour to permit hydrolysis of the silica and alumina molecules in the porcelain particle surfaces and then dried to remove excess moisture. The powder is then immersed in a solution of 1% trimethoxy silyl propyl methacrylate and 99% hexane diluent to which has been added 0.1% acetic acid and thoroughly stirred so that all surfaces are contacted with the silicon bonding agent and reacted and coated therewith. The exces liquid is decanted and excess diluent removed by drying.

The coated powder is placed in a metal mold and subjected to pressure.

The compacted mass then may be retained in or removed from the mold for impregnation with the plastic material.

The composition for the plastic matrix consists of a cross-linked methyl methacrylate slurry or casting resin. The casting is prepared by combining 87% methyl methacrylate monomer, 9% of a suitable crosslinking monomer such as ethylene glycol dimethacrylate, and 4% of a soluble thickening agent, a low molecular weight methyl methacrylate polymer. These materials are thoroughly stirred and agitated for at least 24 hours to ensure complete dissolution of the polymer in the monomers. When complete dissolution has been achieved, the liquid is catalyzed by adding 0.5% benzoyl peroxide.

The casting liquid is then poured over the porous compact of porcelain powders and it permeates the mass by capillary attraction.

Polymerization of the liquid plastic proceeds with the gradual application of externally applied heat at temperatures increasing over 3–4 hours to a maximum of approximately 165° F.

Following the final cure, the moulded composite artificial tooth is finished by removing any seams or undesired mould marks present.

An artificial tooth product having the following approximate composition is produced: 65% porcelain and 35% crosslinked plastic (including bonding agent).

This material is found to possess the hardness and wear resistance associated with dental porcelains while providing ease of processing by a dental technician in regards to shape alteration and completely adequate bonding to a resinous denture base material. These latter qualities are usually only associated with artificial plastic teeth.

*Example 2.*—A similar product is prepared to that shown in Example 1 except that a mixture of 1% dimethyl vinyl chlorosilane in 99% hexane is employed as the chemical bonding agent. Again, a product having the combined properties of both dental porcelains and dental plastics is produced. This product has essentially the same proportions as above, varying only in the composition of the silane bond.

*Example 3.*—The procedure of Example 1 is repeated except that a 2% hexane solution of vinyl dimethyl silanol acidified by the addition of 1% acetic acid is employed as the chemical bonding agent. Again, a superior artificial tooth product is produced.

*Example 4.*—Glass beads, produced by the Minnesota Mining and Manufacturing Company under their designation Super Brite #110 and Super Brite #380 are coated by immersion with a solution of 1% trimethoxy silyl propyl methacrylate and 99% hexane diluent to which 0.1% acetic acid has been added in an amount sufficient to produce a coating of a few molecules in thickness on the surface of the beads. No preliminary hydrolysis of the bead surface is found necessary as sufficient atmospheric moisture results in the formation of hydroxyl ions on the glass bead surfaces.

After the beads of varying sizes are coated and dried, the dry beads are placed into tooth-shaped cavities of a resilient mold placed upon a vertically vibrating table. After slow vibration causing gradual compaction by the influence of gravitational force a compact of maximum density is produced.

At this point, a casting liquid of cyclohexyl methacrylate monomer to which has been added 5% of a crosslink monomer, divinyl benzene, is poured over the compact mass so as to fill the interstices by capillary attraction. Cyclohexyl methacrylate monomer has the advantage of lower polymerization shrinkage than the methyl ester so that it is relatively easily polymerized from a monomeric form without leaving or forming voids which would spoil the complete density of the moulded article.

Curing of the liquid plastic proceeds within the rubber mold until a partial cure has been effected and the tooth is then removed and the cure completed as in Example 1.

The molded composite is finished by polishing.

An artificial tooth product having the following composition is produced: Ceramic, 86%, and crosslinked plastic, 14%.

Here, again, this product is seen to possess the advantageous properties of both dental porcelain and dental plastic products.

*Example 5.*—A conventional dental porcelain compounded from nepheline syenite, or orthoclase feldspar and pigments is fritted at a temperature of 2400° F. until it becomes notably clear or translucent. This subsequently is ground to an average particle size of 200 mesh and is mixed with starch, flour paste, water and lubricants sufficient to render it plastic or moldable. This material is placed into molds with the shape and striations of natural dentition and these molds are vibrated and pressed closed and heated to about 400° F. for 3–5 minutes in order to cause the binders to harden.

The tooth biscuits so formed are placed on fireclay trays which in turn are passed thru automatic "tunnel" furnaces. At about 1000° F., the organic binders carbonize, then oxidize, and the gaseous products of combustion are drawn out thru the furnace flue—leaving a porous, clean compact of porcelain particles in tooth shape. Heating is continued to about 2050° F. (or even as low as 1900° F. if several hours time is allowed); biscuits are removed and cooled. At this stage they are no longer a "compact" but are a porous mass with a definite vitreous bond between particles and an interconnecting system of air channels. These biscuits possess all their external characteristics of anatomy, size, hardness, etc., but are deficient in color (being white), density and bondability. They are placed in a suitable container, air environment is evacuated and a 3% solution of trimethoxysilyl propyl methacrylate in toluene is introduced briefly, sufficient to cover the specimens. The vacuum is broken, excess liquid decanted, and specimens are air dried for several minutes with agitation.

Next the tooth is returned to a different container which is re-evacuated and a solution is added of 90% methyl methacrylate monomer, 6% allyl methacrylate, 4% methyl methacrylate polymer (mol wt. 125,000), and appropriate dyes and colorants. Vacuum is broken, liquid decanted and the teeth wiped superficially.

Teeth then are placed in a pressure vessel where they can be heated gradually to 240° F. under a pressure of 30–35 p.s.i. Following cure and cooling, they are polished, sorted and inspected.

The usual composition produced is: ceramic, 72%, and plastic, 28%.

While certain desirable embodiments of the invention have been illustrated by way of example, it is to be understood that the invention is not limited to these embodiments but is to be regarded as broadly as any and all equivalent structures, composition and combinations. More specifically it is conceived that the plastic impregnation phase might be only partially executed with tooth-colored casting materials, leaving the gingival or ridge surfaces of the tooth silane-coated but porous and receptive to the pink-color plastic which comprises the denture base.

We claim:

1. An artificial tooth consisting essentially of a major proportion of dental porcelain particles, the interstices between said particles being filled with a synthetic dental plastic, said dental plastic and dental porcelain particles being chemically and strongly united by a reactive organic silicon bonding agent present as a coating on said porcelain particles.

2. The artificial tooth of claim 1 wherein the reactive organic silicon bonding agent is selected from the group consistign of compounds of the formulae $RSiX_3$, $R_2SiX_2$, and $R_3SiX$ wherein R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

3. The artifiicial tooth of claim 2 wherein the reactive organic silicon bonding agent is trimethoxysilyl propyl methacrylate.

4. The artificial tooth of claim 2 wherein the reactive organic silicon bonding agent is dimethyl vinyl chlorosilane.

5. The artificial tooth of claim 2 wherein the reactive organic bonding agent is vinyl dimethyl silanol.

6. An artifiicial tooth consisting essentially of powdered dental porcelain particles as a contiguous phase, the interstices between said particles being filled with a synthetic dental plastic, said dental plastic and dental porcelain particles being chemically and strongly united by a reactive organic silicon bonding agent wherein said porcelain particles comprise from a minimum of 50% to about 90% by weight of the composition, the plastic comprises from about 10% to about 50% by weight of the composition and the organic silicon bonding agent is employed in an amount corresponding to about .1% to about 10% by weight of the final composition.

7. The artificial tooth of claim 6 wherein the reactive organic silicon bonding agent is selected from the group consisting of compounds of the formulae $RSiX_3$, $R_2SiX_2$, and $R_3SiX$ wherein R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

8. The artificial tooth of claim 7 wherein the reactive organic silicon bonding agent is trimethoxysilyl propyl methacrylate.

9. The artificial tooth of claim 7 wherein the reactive organic silicon bonding agent is dimethyl vinyl chlorosilane.

10. The artificial tooth of claim 7 wherein the reactive organic silicon bonding agent is vinyl dimethyl silanol.

11. An artificial tooth consisting essentially of a major proportion of a matrix of dental porcelain particles, the interstices of said matrix being filled with a methacrylate-type dental plastic, said methacrylate-type plastic and dental porcelain matrix being chemically and strongly united by a reactive organic silicon bonding agent present as a coating on said porcelain particles of said matrix.

12. The artificial tooth of claim 11 wherein the methacrylate-type dental plastic is polymerized methyl methacrylate.

13. The artificial tooth of claim 11 wherein the reactive organic silicon bonding agent is selected form the group consisting of compounds of the formulae $RSiX_3$, $R_2SiX_2$, and $R_3SiX$ whereas R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

14. The artificial tooth of claim 13 wherein the reactive organic bonding agent is trimethoxysilyl propyl methacrylate.

15. The artificial tooth of claim 13 wherein the reactive organic silicon bonding agent is dimethyl vinyl chlorosilane.

16. The artificial tooth of claim 13 wherein the reactive organic silicon bonding agent is vinyl dimethyl silanol.

17. The artificial tooth of claim 13 wherein the matrix of dental porcelain particles comprises from about 50% to about 90% by weight of the composition, the methacrylate-type plastic filler from about 10% to about 50% by weight of the composition and the reactive organic silicon bonding agent is employed in an amount corresponding to about .1% to about 10% by weight of the final composition.

18. An artificial tooth comprising a veneer of esthetic dental porcelain and inner core consisting essentially of a major portion of a contiguous phase of dental porcelain particles, the interstices of said contiguous phase being filled with a synthetic dental plastic, said dental plastic and dental porcelain contiguous phase being chemically and strongly united by a reactive organic silicon bonding agent present as a coating on said porcelain particles.

19. The artificial tooth of claim 18 wherein the reactive organic silicon bonding agent is selected from the group consisting of compounds of the formulae $RSiX_3$, $R_2SiX_2$, and $R_3SiX$ wherein R is a radical selected from the group consisting of vinyl, methacrylate, allyl, methallyl, itaconate, maleate, acrylate, aconitate, fumarate, alkyl, aryl, alkenyl, crotonate, cinnamate, citraconate, sorbate and glycidyl groups and X is selected from the group consisting of halogen, alkoxy, and hydroxy groups.

20. The artificial tooth of claim 19 wherein the synthetic dental plastic is a methacrylate-type plastic.

(References on following page)

References Cited

UNITED STATES PATENTS

| | | | |
|---|---|---|---|
| 2,463,549 | 3/1949 | Myerson | 32—8 |
| 2,611,958 | 9/1952 | Semmelman | 32—8 |
| 3,052,583 | 9/1962 | Carlstrom et al. | 161—206 X |
| 3,288,893 | 11/1966 | Stebleton | 161—208 X |

FOREIGN PATENTS 890,731  3/1962  Great Britain.

F. BARRY SHAY, *Primary Examiner*.

U.S. Cl. X.R.

117—72, 123; 161—162, 208

UNITED STATES PATENT OFFICE
CERTIFICATE OF CORRECTION

Patent No. 3,423,828　　　　　　　　　　　　　　　　　　January 28, 1969

Benjamin David Halpern et al.

It is certified that error appears in the above identified patent and that said Letters Patent are hereby corrected as shown below:

Column 4, line 9, "containg" should read -- containing --. Column 10, line 31, "form" should read -- from --; line 40, after "organic" insert -- silicon --.

Signed and sealed this 24th day of March 1970.

(SEAL)
Attest:

Edward M. Fletcher, Jr.　　　　　　　　　　WILLIAM E. SCHUYLER, JR.
Attesting Officer　　　　　　　　　　　　　　　Commissioner of Patents